(12) United States Patent
Dallesasse

(10) Patent No.: US 7,380,993 B2
(45) Date of Patent: Jun. 3, 2008

(54) OPTICAL TRANSCEIVER FOR 100 GIGABIT/SECOND TRANSMISSION

(75) Inventor: John Dallesasse, Geneva, IL (US)

(73) Assignee: Emcore Corporation, Albuquerque, NM (US)

(*) Notice: Subject to any disclaimer, the term of this patent is extended or adjusted under 35 U.S.C. 154(b) by 0 days.

(21) Appl. No.: 11/522,198

(22) Filed: Sep. 15, 2006

(65) Prior Publication Data

US 2008/0069570 A1    Mar. 20, 2008

(51) Int. Cl.
G02B 6/36 (2006.01)
H04B 10/00 (2006.01)
H04J 14/00 (2006.01)

(52) U.S. Cl. .................. 385/89; 385/1; 385/2; 385/14; 385/24; 385/88; 385/92; 398/43; 398/45; 398/52; 398/74; 398/135; 398/139

(58) Field of Classification Search .......... 385/1, 385/2, 14, 24, 88, 89, 92; 398/43, 45, 52, 398/74, 135, 139
See application file for complete search history.

(56) References Cited

U.S. PATENT DOCUMENTS

2005/0169319 A1* 8/2005 Mohamadi ............... 370/514

OTHER PUBLICATIONS

Kardontchik, J.E., and Wurster, S.;"300 meters on installed MMF Part I: Architectures," Nov. 1999; Hawaii; http://grouper.ieee.org/groups/802/3/10G_study/public/nov99/kardontchik_1_1199.pdf.
Kardontchik, J.E., and Wurster, S.;"300 meters on installed MMF Part II: BERs and RINs,"; Nov. 1999; Hawaii; http://grouper.ieee.org/groups/802/3/10G_study/public/nov99/kardontchik_2_1199.pdf.
Kardontchik, J.E., and Wurster, S.; "300 meters on installed MMF Part III: Link Simulations"; Nov. 1999; Hawaii; http://grouper.ieee.org/groups/802/3/10G_study/public/nov99/kardontchik_3_1199.pdf.
Kardontchik, J.E.; "PAM-5 at 1.25 Gbaud," (and subsequent thread submissions) (initial thread started on Jan. 27, 2000 and located at http//grouper.ieee.org/groups/802/3/10G_study/email/msg01434.html).
Kardontchik, J.E. and Wurster, S.; "10000LX-4WDM-1.25 and 10000CX-4T-1.25 Transceivers"; Jan. 2000; Dallas, Texas; http://www.ieee802.org/3/10G_study/public/jan00/kardontchik_0100.pdf.
Kardontchik, J.E.; "Open fiber control in Pam-5," (and subsequent thread submissions) (initial thread started on Feb. 22, 2000 and located at http://grouper.ieee.org/groups/802/3/10G_study/email/msg01473.html).
Kardontchik, J.E.; "PAM-5, what are your BERs?" (and subsequent thread submissions) (initial thread started on Feb. 27, 2000 and located at http://grouper.ieee.org/groups/802/3/10G_study/email/msg01492.html).

(Continued)

Primary Examiner—Frank G Font
Assistant Examiner—Michael P Mooney

(57) ABSTRACT

An optical transmitter for converting and coupling an information-containing electrical signal with an optical fiber having an electrical input for coupling with an external electrical cable or information system device having a plurality of parallel data lines, a modulator for converting between an information-containing electrical signal on each data line and a multi-level digital pulse amplitude modulated signal corresponding to the binary electrical signal; and a signal timing circuit coupled to said modulator for aligning the data signal to a predetermined clock signal. The transmitter is preferably wavelength division multiplexed, using an electro-optical subassembly coupled to each respective timer circuit for converting between the information-containing electrical signal and a modulated optical signal corresponding to the electrical signal at a predetermined wavelength. The transceiver is preferably implemented in a pluggable standardized form factor.

3 Claims, 3 Drawing Sheets

OTHER PUBLICATIONS

Gilliland, P. "OFC revived; 2.5 bit Ethernet," (thread submission on Mar. 1, 2000 and located at) http://grouper.ieee.org/groups/802/3/10G_study/email/msg01655.html).

Widmer, A.; "PAM5 and 8B10B and FEC," (and subsequent thread submissions) (initial thread started on Mar. 2, 2000 and located at http://grouper.ieee.org/groups/802/3/10G_study/email/msg01663.html).

Kardontchik, J.E.; "PAM5 and 8B10B and FEC and SAME_BAUD,". (and subsequent thread submissions) (initial thread started on Mar. 2, 2000 and located at http://grouper.ieee.org/groups/802/3/10G_study/email/msg01656.html).

Kardontchik, J.E.; "PAM-5: Tx waveshaping at 5 Gbaud," (and subsequent thread submissions) (initial thread started on Mar. 3, 2000 and located at http://grouper.ieee.org/groups/802/3/10G_study/email/msg01669.html).

Kardontchik, J.E.; ."PAM-5 fairy tale," (and subsequent thread submissions) (initial thread started on Mar. 4, 2000 and located at http://grouper.ieee.org/groups/802/3/10G_study/email/msg01671.html).

Kardontchik, J.E., Wurster, S., and Yegnanarayanan, S; ."850nm-4WDM-1.25 Gbaud transceiver over Multimode Fiber for 10 GbE"; Mar. 2000; New Mexico http://grouper.ieee.org/groups/802/3/ae/public/mar00/kardontchik_1_0300.pdf.

Kelly, P.; "RE: PAM5 Objectives"; IEEE P802.3ae 10Gb/s Ehternet PAM Ad Hoc Email Archive; Mar. 29, 2000; http://www.ieee802.org/3/10G_study/public/pam_adhoc/email/msg00009.html.

Kelly, P.; "RE: PAM5 Objectives"; IEEE P802.3ae 10Gb/s Ehternet PAM Ad Hoc Email Archive; Mar. 29, 2000; http://www.ieee802.org/3/10G_study/public/pam_adhoc/email/msg00004.html.

Taborek, R.; "RE: PAM5 Objectives"; IEEE P802.3ae 10Gb/s Ehternet PAM Ad Hoc Email Archive; Mar. 29, 2000; http://www.ieee802.org/3/10G_study/public/pam_adhoc/email/msg00008.html.

Kelly, P.; "RE: PAM5 Objectives"; IEEE P802.3ae 10Gb/s Ehternet PAM Ad Hoc Email Archive; Mar. 29, 2000; http://www.ieee802.org/3/10G_study/public/pam_adhoc/email/msg00003.html.

Hoge, J.; "RE: PAM5 Objectives"; IEEE P802.3ae 10Gb/s Ehternet PAM Ad Hoc Email Archive; Mar. 29, 2000; http://www.ieee802.org/3/10G_study/public/pam_adhoc/email/msg00001.html.

Taborek, R.; "RE: PAM5 Objectives"; IEEE P802.3ae 10Gb/s Ehternet PAM Ad Hoc Email Archive; Mar. 29, 2000; http://www.ieee802.org/3/10G_study/public/pam_adhoc/email/msg00007.html.

Kardontchik, J; "RE: PAM5 Objectives"; IEEE P802.3ae 10Gb/s Ehternet PAM Ad Hoc Email Archive; Mar. 29, 2000; http://www.ieee802.org/3/10G_study/public/pam_adhoc/email/msg00006.html.

Taborek, R.; "RE: PAM5 Objectives" ; IEEE P802.3ae 10Gb/s Ehternet PAM Ad Hoc Email Archive; Mar. 29, 2000; http://www.ieee802.org/3/10G_study/public/pam_adhoc/email/msg00005.html.

Kardontchik, J; "RE: PAM5 Objectives"; Mar. 29, 2000; http://www.ieee802.org/3/10G_study/public/pam_adhoc/email/msg00002.html.

Kelly, P.; "PAM5 Objectives"; Mar. 29, 2000; http://www.ieee802.org/3/10G_study/public/pam_adhoc/email/msg00000.html.

Hoge, J.; "RE: PAM5 Objectives"; IEEE P802.3ae 10Gb/s Ehternet PAM Ad Hoc Email Archive; Mar. 30, 2000; http://www.ieee802.org/3/10G_study/public/pam_adhoc/email/msg00010.html.

Hoge, J.; "RE: PAM5 Objectives"; IEEE P802.3ae 10Gb/s Ehternet PAM Ad Hoc Email Archive; Mar. 30, 2000; http://www.ieee802.org/3/10G_study/public/pam_adhoc/email/msg00011.html.

Hoge, J.; "RE: PAM5 Objectives"; IEEE P802.3ae 10Gb/s Ehternet PAM Ad Hoc Email Archive; Mar. 30, 2000; http://www.ieee802.org/3/10G_study/public/pam_adhoc/email/msg00012.html.

Hoge, J.; "RE: PAM5 Objectives"; IEEE P802.3ae 10Gb/s Ehternet PAM Ad Hoc Email Archive; Mar. 30, 2000; http://www.ieee802.org/3/10G_study/public/pam_adhoc/email/msg00013.html.

Hoge, J.; "RE: PAM5 Objectives"; IEEE P802.3ae 10Gb/s Ehternet PAM Ad Hoc Email Archive; Mar. 30, 2000; http://www.ieee802.org/3/10G_study/public/pam_adhoc/email/msg00014.html.

Kelly, P.; "RE: PAM5 Objectives"; IEEE P802.3ae 10Gb/s Ehternet PAM Ad Hoc Email Archive; Mar. 30, 2000; http://www.ieee802.org/3/10G_study/public/pam_adhoc/email/msg00015.html.

Hoge, J.; "EMI, Pigtails, and Isolators"; IEEE P802.3ae 10Gb/s Ehternet PAM Ad Hoc Email Archive; Mar. 31, 2000; http://www.ieee802.org/3/10G_study/public/pam_adhoc/email/msg00016.html.

Toborek, R.; "RE: EMI, Pigtails, and Isolators"; IEEE P802.3ae 10Gb/s Ehternet PAM Ad Hoc Email Archive; Apr. 1, 2000; http://www.ieee802.org/3/10G_study/public/pam_adhoc/email/msg00017.html.

Yousefi, N.; "PAM Conference Call"; IEEE P802.3ae 10Gb/s Ehternet PAM Ad Hoc Email Archive; Apr. 7, 2000; http://www.ieee802.org/3/10G_study/public/pam_adhoc/email/msg00020.html.

Kelly, P.; "Conference Call Next Week?"; IEEE P802.3ae 10Gb/s Ehternet PAM Ad Hoc Email Archive; Apr. 7, 2000; http://www.ieee802.org/3/10G_study/public/pam_adhoc/email/msg00018.html.

Toborek, R.; "RE: Conference Call Next Week"; IEEE P802.3ae 10Gb/s Ehternet PAM Ad Hoc Email Archive; Apr. 7, 2000 http://www.ieee802.org/3/10G_study/public/pam_adhoc/email/msg00021.html.

Yousefi, N.; "RE: Conference Call Next Week"; IEEE P802.3ae 10Gb/s Ehternet PAM Ad Hoc Email Archive; Ap. 7, 2000; http://www.ieee802.org/3/10G_study/public/pam_adhoc/email/msg00019.html.

Yousefi, N. "Meeting Summary"; IEEE P802.3ae 10Gb/s Ehternet PAM Ad Hoc Email Archive; Apr. 12, 2000; http://www.ieee802.org/3/10G_study/public/pam_adhoc/email/msg00022.html.

Thatcher, J.; "802.3ae and the 10GEA"; IEEE P802.3ae 10Gb/s Ehternet PAM Ad Hoc Email Archive; Apr. 17, 2000; http://www.ieee802.org/3/10G_study/public/pam_adhoc/email/msg00023.html.

Kardontchik, J.; "RE: 802.3ae and the 10GEA"; IEEE P802.3ae 10Gb/s Ehternet PAM Ad Hoc Email Archive; Apr. 17, 2000; http://www.ieee802.org/3/10G_study/public/pam_adhoc/email/msg00026.html.

Chang, E.; "RE: 850nm-4WDM-1.25Gbaud"; IEEE P802.3ae 10Gb/s Ehternet PAM Ad Hoc Email Archive; Apr. 17, 2000; http://www.ieee802.org/3/10G_study/public/pam_adhoc/email/msg00025.html.

Booth, B.; "RE: 850nm-4WDM-1.25Gbaud"; IEEE P802.3ae 10Gb/s Ehternet PAM Ad Hoc Email Archive; Apr. 17, 2000; http://www.ieee802.org/3/10G_study/public/pam_adhoc/email/msg00024.html.

Hoge, J..; "RE: 802.3ae and the 10GEA"; IEEE P802.3ae 10Gb/s Ehternet PAM Ad Hoc Email Archive; Apr. 18, 2000; http://www.ieee802.org/3/10G_study/public/pam_adhoc/email/msg00028.html.

Chang, E.; "RE: 802.3ae and the 10GEA"; IEEE P802.3ae 10Gb/s Ehternet PAM Ad Hoc Email Archive; Apr. 18, 2000; http://www.ieee802.org/3/10G_study/public/pam_adhoc/email/msg00027.html.

Hoge, J..; "RE: 802.3ae and the 10GEA"; IEEE P802.3ae 10Gb/s Ehternet PAM Ad Hoc Email Archive; Apr. 19, 2000; http://www.ieee802.org/3/10G_study/public/pam_adhoc/email/msg00029.html.

Chang, E.; "RE: 802.3ae and the 10GEA"; IEEE P802.3ae 10Gb/s Ehternet PAM Ad Hoc Email Archive; Apr. 19, 2000; http://www.ieee802.org/3/10G_study/public/pam_adhoc/email/msg00030.html.

Hoge, J..; "RE: 802.3ae and the 10GEA"; IEEE P802.3ae 10Gb/s Ehternet PAM Ad Hoc Email Archive; Apr. 20, 2000; http://www.ieee802.org/3/10G_study/public/pam_adhoc/email/msg00032.html.

Chang, E.; "RE: 802.3ae and the 10GEA"; IEEE P802.3ae 10Gb/s Ehternet PAM Ad Hoc Email Archive; Apr. 20, 2000; http://www.ieee802.org/3/10G_study/public/pam_adhoc/email/msg00031.html.

Hoge, J..; "RE: 802.3ae and the 10GEA"; IEEE P802.3ae 10Gb/s Ehternet PAM Ad Hoc Email Archive Apr. 21, 2000; http://www.ieee802.org/3/10G_study/public/pam_adhoc/email/msg00033.html.

Chan, C.C.; Jin, W.; Ho, H.L. and Demokan, M. S.; "Performance analysis of a time-division-multiplexed fiber Bragggrating sensor array by use of tunable laser source"; IEEE Journal of Selected Topices in Quantum Electronics; Sep./Oct. 2000; pp. 741-749; vol. 6; http://ieeexplore.ieee.org/xpls/absprintf.jsp?arnumber=892613.

Montant, S.; Ribeyre, X.; Videau, L.; Rouyer, C.; Sauteret, C. and Migus, A.; "All-optical programmable 100 GHz phase modulation of narrow band nanosecond energetic pulses"; Lasers and Electro-Optics; 2002; 278-279; vol. 1; http://ieeexplore.ieee.org/xpl/absprintf.jsp?arnumber=1033945.

Panduit Corp.; "Overview of Gigabit Ethernet (1000Base-T)"; 2003; ".www.panduit.com/products/WhitePapers/098766.pdf".

Bucholtz, F.; Urick, V.J. and Campillo, A.L.' "Comparison of crosstalk for amplitude and phase modulation in an analog fiber optic link"; 2004 IEEE International Topical Meeting on Microwave Photonics; Oct. 2004; pp. 66-69 http://ieeexplore.ieee.org/xpls/absprintf.jsp?arnumber=1396837.

Alexander, J.; Debiec, T.; "10GBase-T brings blazing speed" by Tech World; Sep. 2004; http://www.techworld.com/features/index.cfm?featureID=835&printerfriendly=1.

Bernussi, A.A.; De Peralta, L.G.; Knapczyk, M.Gale, R. and Temkin, H.; "Reconfigurable sampling of the electric field at the reflecting surface of folded arrayed waveguide grating multiplexers"; IEEE Photonics Technology Letters; Oct. 2004; pp. 2257-2259; vol. 16; http://ieeexplore.ieee.org/xpls/absprintf.jsp?arnumber=1336895.

Fukaishi, M.; "GHz serial link transceiver using multiple-valued data representation"; Japan www.pu-toyama.ac.jp/EI/ulsi2002/fukaishi.pdf.

* cited by examiner

OPTICAL TRANSCEIVER FOR 100 GIGABIT/SECOND TRANSMISSION

REFERENCE TO RELATED APPLICATIONS

This application is related to co-pending U.S. patent application Ser. No. 10/866,265 filed Jun. 14, 2004, assigned to the common assignee.

This application is also related to co-pending U.S. patent application Ser. No. 11/212,822 filed Aug. 25, 2005, assigned to the common assignee.

BACKGROUND OF THE INVENTION

1. Field of the Invention

The invention relates to optical transceivers, and in particular to optical signal modulation techniques that provide a communications link between computers or communications units over optical fibers, such as used in high throughput fiber optic communications links in local and wide area networks and storage area networks.

2. Description of the Related Art

Communications networks have experienced dramatic growth in data transmission traffic in recent years due to worldwide Internet access, e-mail, and e-commerce. As Internet usage grows to include transmission of larger data files, including content such as full motion video on-demand (including HDTV), multi-channel high quality audio, online video conferencing, image transfer, and other broadband applications, the delivery of such data will place a greater demand on available bandwidth. The bulk of this traffic is already routed through the optical networking infrastructure used by local and long distance carriers, as well as Internet service providers. Since optical fiber offers substantially greater bandwidth capacity, is less error prone, and is easier to administer than conventional copper wire technologies, it is not surprising to see increased deployment of optical fiber in data centers, storage area networks, and enterprise computer networks for short range network unit to network unit interconnection.

Such increased deployment has created a demand for electrical and optical transceiver modules that enable data system units such as computers, storage units, routers, and similar devices to be optionally coupled by either an electrical cable or an optical fiber to provide a high speed, short reach (less than 50 meters) data link within the data center.

A variety of optical transceiver modules are known in the art to provide such interconnection that include an optical transmit portion that converts an electrical signal into a modulated light beam that is coupled to a first optical fiber, and a receive portion that receives a second optical signal from a second optical fiber and converts it into an electrical signal. The electrical signals are transferred in both directions over electrical connectors that interface with the network unit using a standard electrical data link protocol.

The optical transmitter section includes one or more semiconductor lasers and an optical assembly to focus or direct the light from the lasers into an optical fiber, which in turn, is connected to a receptable or connector on the transceiver to allow an external optical fiber to be connected thereto using a standard SC, FC or LC connector. The semiconductor lasers are typically packaged in a hermetically sealed can or similar housing in order to protect the laser from humidity or other harsh environmental conditions. The semiconductor laser chip is typically a distributed feedback (DFB) laser with dimensions of a few hundred microns to a couple of millimeters wide and 100-500 microns thick. The package in which they are mounted typically includes a heat sink or spreader, and has several electrical leads coming out of the package to provide power and signal inputs to the laser chips. The electrical leads are then soldered to the circuit board in the optical transceiver. The optical receive section includes an optical assembly to focus or direct the light from the optical fiber onto a photodetector, which, in turn, is connected to a transimpedance amplifier/limiter circuit on a circuit board. The photodetector or photodiode is typically packaged in a hermetically sealed package in order to protect it from harsh environmental conditions. The photodiodes are semiconductor chips that are typically a few hundred microns to a couple of millimeters wide and 100-500 microns thick. The package in which they are mounted is typically from three to six millimeters in diameter and two to five millimeters tall, and has several electrical leads coming out of the package. These electrical leads are then soldered to the circuit board containing the amplifier/limiter and other circuits for processing the electrical signal.

Optical transceiver modules are therefore packaged in a number of standard form factors which are "hot pluggable" into a rack mounted line card network unit or the chassis of the data system unit. Standard form factors set forth in Multi Source Agreements (MSAs) provide standardized dimensions and input/output interfaces that allow devices from different manufacturers to be used interchangeably. Some of the most popular MSAs include XENPAK (see www.xenpak.org), X2 (see www.X2msa.org), SFF ("small form factor"), SFP ("small form factor pluggable"), and XFP ("10 Gigabit Small Form Factor Pluggable", see www.XFPMSA.org).

A Multi-Source Agreement (MSA) for 40 Gigabit per second optical transceivers using a 300-pin package for mounting on a printed circuit card or board has also been developed (see www.300pinmsa.org).

Customers are interested in more miniaturized transceivers in order to increase the number of interconnections or port density associated with the network unit, such as, for example in rack mounted line cards, switch boxes, cabling patch panels, wiring closets, and computer I/O interfaces.

Although these conventional pluggable designs have been used for low date rate applications, the objective of miniaturization often competes with increased data rate which is an ever-constant objective in the industry.

The increasing demand for higher data rates and greater throughput in optical fiber networks has created increased attention on a variety of techniques to modulate and encode digital data signals for transmission on optical fiber. One technique called wavelength division multiplexing (WDM) is the use of multiple wavelengths to carry multiple signal channels and thereby greatly increase the capacity of transmission of optical signals over the installed fiber optic networks. See, for example, Kartalopoulos, DWDM Networks, Devices, and Technology (IEEE Press, 2002).

In a WDM optical system, light from several lasers, each having a different central wavelength, is combined into a single beam that is introduced into an optical fiber. Each wavelength is associated with an independent data signal through the optical fiber. At the exit end of the optical fiber, a demultiplexer is used to separate the beam by wavelength into the independent signals. In this way, the data transmission capacity of the optical fiber is increased by a factor equal to the number of single wavelength signals combined into a single fiber.

In the optical transceiver, demultiplexing devices are typically designed to selectively direct several channels from a single multiple-channel input beam into separate output channels. Multiplexing devices are typically designed to provide a single multiple-channel output beam by combining a plurality of separate input beams of different wavelengths. A multiplexing/demultiplexing device operates in either the multiplexing or demultiplexing mode depending on its orientation in application, i.e., depending on the choice of direction of the light beam paths through the device.

In prior art WDM systems, data carrying capacity may be increased by adding optical channels. Conceptually, each wavelength channel in an optical fiber operates at its own data rate. In fact, optical channels can carry signals at different speeds. In current commercial systems, the use of WDM can push total capacity per fiber to terabits per second, although practical systems are closer to 100 Gbps. Generally, more space is required between wavelength channels when operating at 10 per second than at 2.5 per second, but the total capacities are nonetheless impressive. For example, in the case of four wavelength channels at a data rate per channel of 2.5 gigabits per second, a total rate of 10 gigabits per second is provided. Using eight wavelength channels at a data rate per channel of 2.5 gigabits per second, a total data rate of 20 gigabits per second is attained. In fact, other wavelength channels can be included, for example, 16, 32, 40 or more wavelength channels operating at 2.5 gigabits per second or 10 gigabits per second and allow much higher data throughput possibilities. Furthermore, it is also known in the prior art to use multiple optical fibers in a single cable or conduit to provide even higher transmission rates in a point to point link.

Although high throughput telecommunications networks do not constrain the size of the optical transceiver, optical transceivers for data center applications that use the Ethernet data communications protocol generally conform to IEEE 802.3 standard specifications and MSA form factors. Ethernet (the IEEE 802.3 standard) is the most popular data link network protocol. The Gigabit Ethernet Standard (IEEE 802.3) was released in 1998 and included both optical fiber and twisted pair cable implementations. The 10 GB/sec Ethernet standard (IEEE 802.3 ae) was released in 2002 with optical fiber cabling. Support for twisted pair cabling was added in subsequent revisions.

The 10 Gigabit Ethernet Standard specifications set forth in the IEEE 802.3ae-2002 supplement to the IEEE 802.3 Ethernet Standard are currently the highest data rate that is standardized under the IEEE 802.3 framework. The supplement extends the IEEE 802.3 protocol and MAC specification therein to an operating speed of 10 Gb/s. Several Physical Coding Sublayers known as 10GBASE-X, 10GBASE-R and 10-GBASE-W are specified, as well as a 10 Gigabit Media Independent Interface (XGMII), a 10 Gigabit Attachment Unit Interface (XAUI), a 10 Gigabit Sixteen-Bit Interface (XSBI), and management (MDIO).

The physical layers specified include 10GBASE-S (R/W), a 850 nm wavelength serial transceiver which uses two multimode fibers. 10GBASE-LX4, a 1310 nm wavelength division multiplexing (WDM) transceiver which uses two multi-mode or single mode fibers; 10GBASE-L (R|W), a 1310 nm wavelength serial transceiver which uses two single mode fibers, and 10GBASE-E (R/W), a 1550 nm wavelength serial transceiver which uses two single mode fibers.

The 10-Gigabit media types use a variety of letters to represent the fiber optic wavelengths they use as well as the type of signal encoding used.

In the 10GBASE-X media types, an "S" stands for the 850 nanometer (nm) wavelength of fiber optic operation, an "L" stands for 1310 nm, and an "E" stands for 1550 nm. The letter "X" denotes 8B/10B signal encoding, while "R" denotes 66B encoding and "W" denotes the WIS interface that encapsulates Ethernet frames for transmission over a SONET STS-192c channel.

The 10GBASE-SR and 10GBASE-SW physical layer devices are designed for use over short wavelength (850 nm) multimode fiber (MMF). The design goal of these media types is from two meters to 300 meters of fiber distance, depending on the qualities of the fiber optic cable used. The 10GBASE-SR physical layer devices are designed for use over dark fiber, meaning a fiber optic cable that is not in use and that is not connected to any other equipment. The 10GBASE-SW media type is designed to connect to SONET equipment, which is typically used to provide long distance data communications.

The 10GBASE-LR and 10GBASE-LW physical layer devices are designed for use over long wavelength (1310 nm) single-mode fiber (SMF). The design goal of these physical layer devices is transmission from two meters to 10 kilometers (32,808 feet) of fiber distance, depending on cable type and quality (longer distances are possible). The 10GBASE-LR physical layer device is designed for use over dark fiber, while the 10GBASE-LW physical layer device is designed to connect to SONET equipment.

The 10GBASE-ER and 10GBASE-EW physical layer devices are designed with a 1550 nm optical signal for extended reach (40 km) over single-mode fiber (SMF). The design goal of these physical layer devices is transmission from two meters up to 40 kilometers (131,233 feet), depending on cable types and quality (longer distances are possible). The 10GBASE-ER media type is designed for use over dark fiber transmission, while the 10GBASE-EW media type is designed to connect to SONET equipment.

Finally, there is a 10GBASE-LX4 physical layer device, which uses wavelength division multiplexing technology to send signals over four wavelengths of light carried over a single pair of fiber optic cables. The 10GBASE-LX4 system is designed to operate at 1310 nm over multi-mode or single-mode dark fiber. The design goal for this media system is from two meters up to 300 meters over multimode fiber or from two meters up to 10 kilometers over single-mode fiber, with longer distances possible depending on cable type and quality.

WDM high date rate applications have found widespread application in short reach Ethernet networks The difficulties associated with multi-gigabit signaling over existing wiring has limited the applications for such cabling, although efforts are currently underway for new copper cabling standards.

The use of course wavelength division multiplexing (CWDM) that utilizes just four optically multiplexed channels each transmitting a 3.125 Gb/sec signal over a single fiber pair (i.e. utilizing one fiber for each direction), is set forth in IEEE 802.3ae Clause 53 in the 10GBASE-LX4 Physical Media Dependent (PMD) sublayer. An optical transceiver designed for operating in conformance with such protocol is described in U.S. patent application Ser. No. 10/866,265, herein incorporated by reference.

Among the features defined in the 10 Gigabit Ethernet draft standard is the XAUI (pronounced "Zowie") electrical interface. The "AUI" portion of the acronym is borrowed from the Ethernet "Attachment Unit Interface". The "X" in the acronym represents the Roman numeral for ten and implies ten gigabits per second. The XAUI is a low pin count, self-clocked serial bus designed as an interface extender for the 74 signal wide interface (32-bit data paths for each of transmit and received) XGMII. The XAUI may be used in place of, or to extend, the XGMII in chip-to-chip applications typical of most Ethernet MAC to PHY interconnects.

In the transmit direction, the MAC parallel electrical interface (XAUI) is monitored and retimed by the physical layer device (PHY). The XAUI bus is a four lane, 8b/10b encoded, 3.125 Gb/s CML electrical signal. Much like scrambling in traditional SONET systems, 8b/10b encoding ensures DC-balance (the average number of logic ones is equal to the average number of logic zeros) and a minimum transition density simplifying the optical and integrated circuit architecture. The retimed XAUI bus modulates an optical transmitter array, generating four optical Non-Return-to-Zero (NRZ) waveforms. Each optical transmitter operates at a different wavelength, near 1310 nm with a 24.5 nm channel center spacing and 13.4 nm passband. The optical signals are wavelength division multiplexed for transmission over a single fiber.

In the receive direction, the CWDM signal is optically demultiplexed into its four constituent wavelengths. A quad receiver array converts the demultiplexed optical signals into four 3.125 Gb/s electrical signals. The PHY device performs clock recovery on each data lane, retimes the signal, and monitors the network interface performance. The retimed XAUI interface is then transmitted to the MAC device.

Prior to the present invention, there has not been a suitable architecture for a high speed data communications (in the 100 Gbps range) in a small, pluggable form factor.

SUMMARY OF THE INVENTION

1. Objects of the Invention

It is an object of the present invention to provide a high speed optical transceiver capable of at least 100 Gbps in a small pluggable standardized form factor.

It is still another object of the present invention to provide an optical transceiver for use in an optical wavelength division multiplexed (WDM) transmission system suitable for short range and long haul applications using multilevel digital pulse amplitude modulation.

It is still another object of the present invention to provide an optical multiplexer in a lane alignment and signal deskewing in a WDM optical transceiver using pulse amplitude modulation encoding.

It is also another object of the present invention to provide an optical transceiver for use in an optical transmission system with a signal timing circuit connected to each lane in a WDM system.

2. Features of the Invention

Briefly, and in general terms, the present invention provides an optical fiber having an electrical input for coupling with an external electrical cable or information system device having a plurality of parallel data lines and for transmitting information-containing electrical communication signals over said data lines, and a fiber optic connector adapted for coupling with an external optical fiber for transmitting an optical communication signal; a modulator for converting between an information-containing electrical signal on each data line and a pulse amplitude modulated signal corresponding to the binary electrical signal; a signal timing circuit coupled to said modulator for aligning the data signal to a predetermined clock signal; an electro-optical subassembly coupled to each respective timer circuit for converting between the information-containing electrical signal and a modulated optical signal corresponding to the electrical signal at a predetermined wavelength; and a multiplexer for multiplexing the respective optical beams into a single optical beam for transmission over the optical fiber.

Briefly, and in general terms, the present invention provides an optical transceiver for converting and coupling an information-containing electrical signal with an optical fiber including a housing including an electrical connector with suitable electrical specifications adapted for 100 G operation for coupling with an external electrical cable or information system device and a fiber optic connector adapted for coupling with an external optical fiber, at least one electro-optical subassembly in the housing for converting between an information containing electrical signal and a modulated optical signal corresponding to the electrical signal including a transmitter subassembly including first and second lasers operating at different wavelengths and modulated with respective first and second electrical signals using multilevel digital pulse amplitude modulation for emitting first and second laser light beams, and an optical multiplexer for receiving the first and second beams and multiplexing the respective optical signals into a single multi-wavelength beam.

Additional objects, advantages, and novel features of the present invention will become apparent to those skill in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications modifications and embodiments in other fields, which are within the scope of the invention as disclosed and claimed herein and with respect to which the invention could be of utility.

BRIEF DESCRIPTION OF THE DRAWINGS

These and other features and advantages of this invention will be better understood and more fully appreciated by reference to the following detailed description when considered in conjunction with the accompanying drawings, wherein.

Figure 1A:
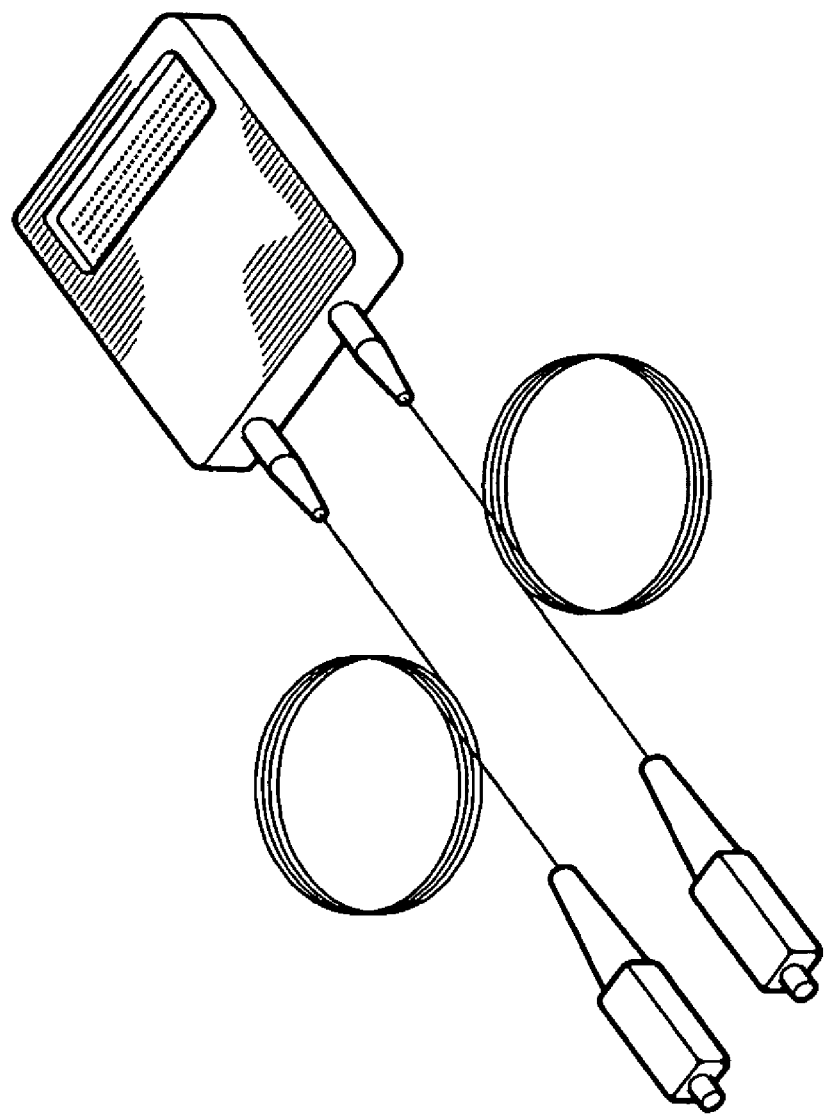
FIG. 1A is a perspective view of an optical transceiver module in which an exemplary embodiment in accordance with aspects of the present invention may be implemented in a 300-pin connector.

The novel features and characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF THE PREFERRED EMBODIMENT

Details of the present invention will now be described, including exemplary aspects and embodiments thereof.

Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments or the relative dimensions of the depicted elements, and are not drawn to scale.

Figure 1B:
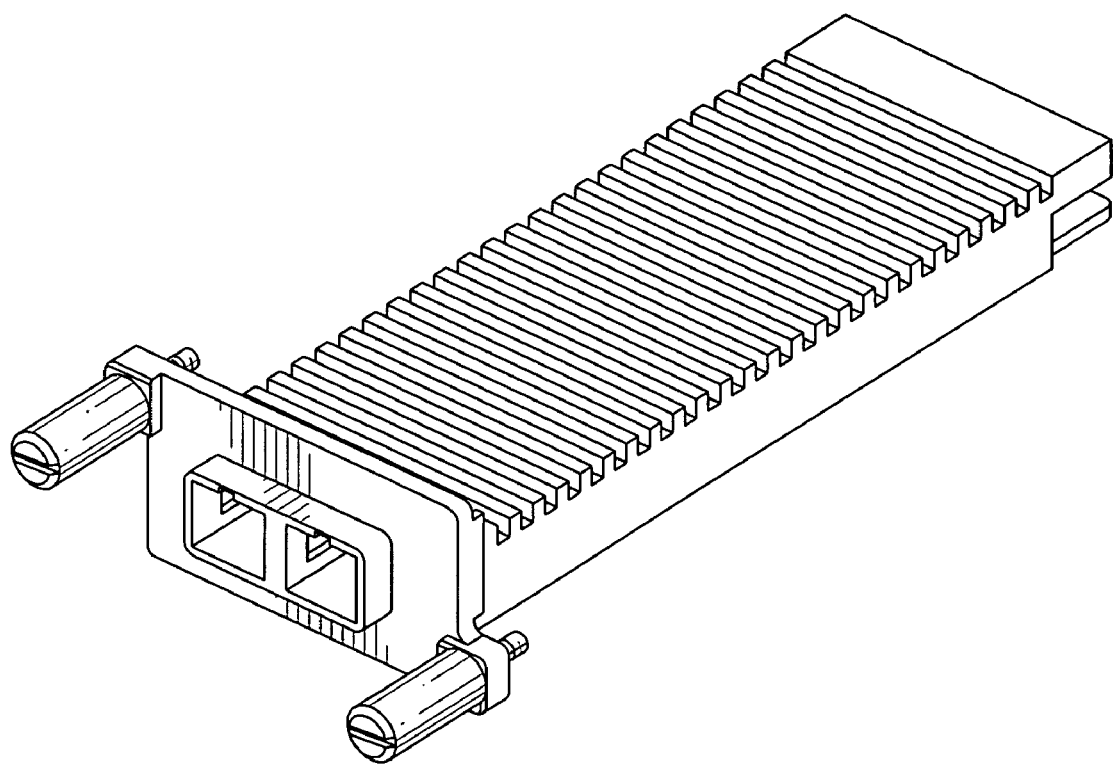
FIG. 1B is a perspective view of an optical transceiver module in which an exemplary embodiment in accordance with aspects of the present invention may be implemented in a XENPAK type housing.

FIG. 1A and FIG. 1B are perspective views of an optical transceiver module 100 in which an exemplary embodiment in accordance with aspects of the present invention may be implemented. In particular, FIG. 1A depicts the 300-pin form factor, and FIG. 1B depicts the XENPAK type form factor.

In this particular embodiment, the module 100 is similar to the IEEE 802.3ae 10GBASE-LX4 Physical Media Dependent sub-layer (PMD) by having the same laser frequency and is implemented in the XENPAK form factor. It is to be noted, however, that in other embodiments the transceiver module 100 may be configured to operate under various other standard protocols (such as Fibre Channel or SONET) and be manufactured in various alternate form factors. The module 100 is preferably a 100 Gigabit Wide Wavelength Division Multiplexed (WWDM) transceiver having four 10 Gbps distributed feedback lasers that enable transmission of an optical signal at least 300 meters over a single legacy installed multimode fiber or a distance from 10 to 40 km over a single standard single mode fiber.

The transceiver module 100 includes a two-piece housing 102 including a base 104 and a cover 106. In addition, contact strips (not shown) may be provided to ground the module to an external chassis ground as well. The housing 102 is constructed of die-case or milled metal, preferably die-cast zinc, although other materials also may be used, such as specialty plastics and the like. Preferably, the particular material used in the housing construction assists in reducing EMI.

The front end of the housing 102 includes a faceplate 131 for securing a pair of receptacles 124, 126. The receptacles, 124, 126 are configured to receive fiber optic connectors (not shown) which mate with optical plugs 128, 130 respectively. In the preferred embodiment, the connector receptacles 124, 126 are configured to receive industry standard LC duplex connectors. As such, keying channels 132, 134 are provided to ensure that the LC connectors are inserted into the receptacles 124, 126 in their correct orientation. Further, as shown in the exemplary embodiment and discussed further herein, the connector receptacle 124 is intended for an LC transmitter connector, and the connector receptacle 126 receives an LC receiver connector.

In one embodiment, the housing 102 holds three subassemblies or circuit boards, including a transmit board 108, a receive board 110, and a physical coding sublayer (PCS)/ physical medium attachment (PMA) board 112, which is used to provide an electrical interface to external computer or communications units (not shown). The transmit subassembly includes four distributed feedback (DFB) semiconductor lasers mounted which may be mounted in a single, hermetically sealed enclosure 415, which interfaces to a fiber coupling subassembly 416. The transmit board 108 is secured in place at the bottom of the housing using a brace 418 attached to the coupling subassembly 416. The brace also functions as a heat sink for dissipating heat from the metallic fiber coupling subassembly 416. In addition, the transmit board 108 and receive board 110 are connected to the PCS/PMA board 112 by respective flex interconnects 120, or other board-to-board electrical connectors or cables.

Thermally conductive gap pads may be provided to transmit the heat generated by the lasers or other components in the transmitter subassembly to the base 104 or cover 106 of the housing, which acts as a heat sink. The receiver subassembly 110 is directly mounted on the housing base 104 using a thermally conductive adhesive to achieve heat dissipation. Different subassemblies therefore dissipate heat to different portions of the housing for a more uniform heat dissipation. The output optical signal from the four lasers is multiplexed and input into a single optical fiber 420 which coils and reverses direction, and is preferably attached or mounted on a flexible substrate 140. The flexible material may be an optical flexible planar material such as FlexPlane™ available from Molex, Inc. of Lisle, Ill., although other flexible substrate may be used as well. The optical fiber 420 originating from the transmitter subassembly is thereby routed to the transmit optical connector plug 130, which is attached to the housing 102. The fiber is routed and attached in such a manner as to minimize sharp bends in the optical fiber to avoid optical loss and mechanical failure.

The flexible substrate 140 may include an opening 142 or hole in a portion of the material that is located directly above the retimer IC or other heat generating components mounted on the PCS/PMA board 112. The opening 142, which is substantially an area the size of the unused portion of the substrate 140, enables the heat sink on the cover 106 to contact a heat transmission gap pad 160, so as to provide access and a heat conductive path to the mounted components on the board 112. This area on the board 112 normally would be inaccessible if not for the opening 142. For example, a heat sink may be installed without interfering with the routing of the optical fibers on the substrate 140 and without removing the mounted substrate 140 to allow access to the PCS/PMA board 112.

Figure 2:
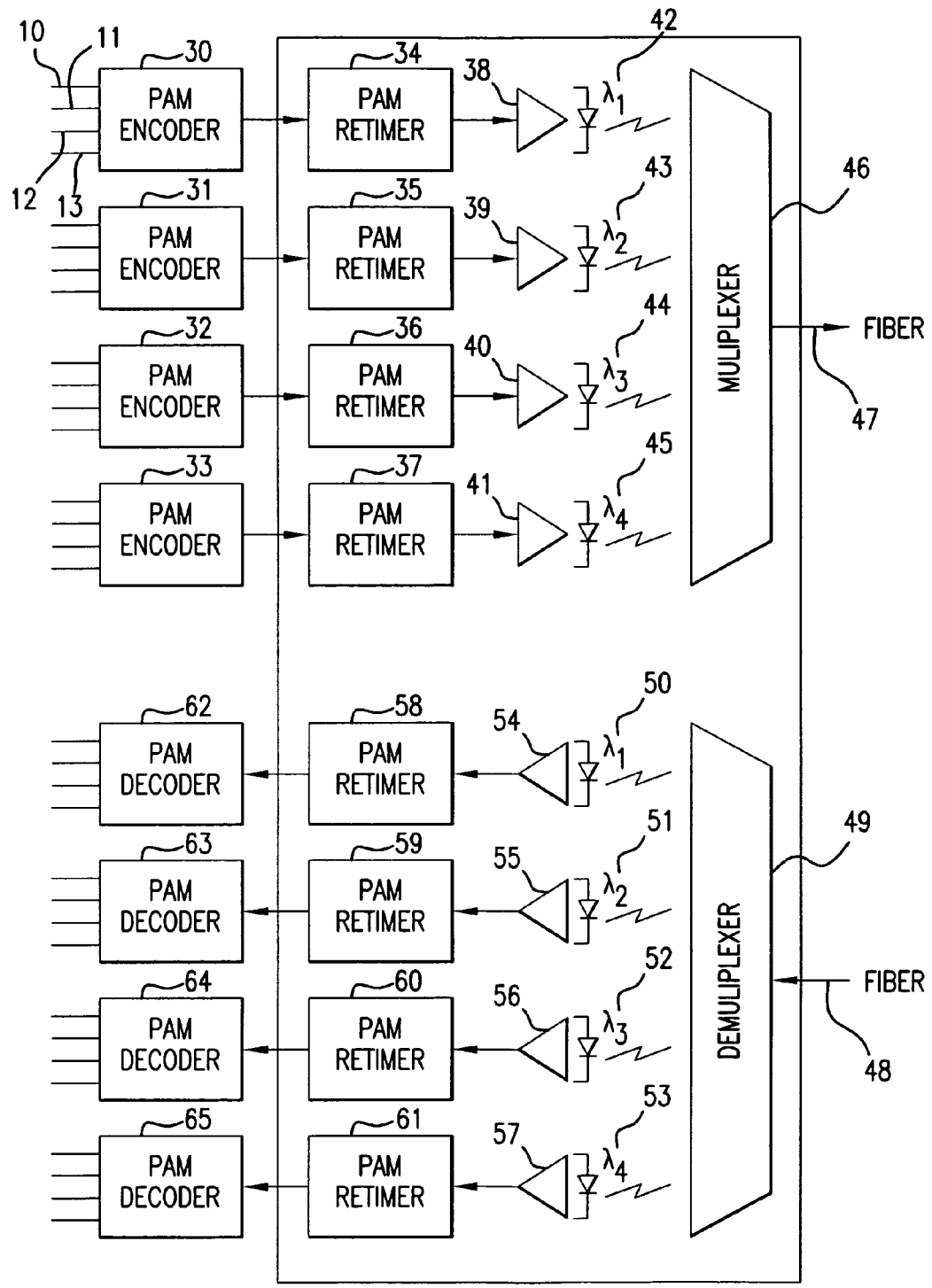
FIG. 2 is a highly simplified block diagram of the optical transceiver according to the present invention.

FIG. 2 is a highly simplified block diagram of the optical transceiver according to the first embodiment of the present invention. The left side of the figure depicts the electrical input and output which is represented by a plurality of serial data signal lines 10, 11, 12, etc.

A variety of different serial data formats are used in fiber optic systems. The Optical Internetworking Forum (OIF) has defined a 40 Gb/s interface known as Serdes Framer Interface Level 5 (SFI-5) with sixteen (16) data lanes and one lane, each lane running at a data rate between 2.5 and 3.125 Gbps.

The term "Serdes" refers to SERialization and DESerialization. This standard defines the interface between a Serdes component, a forward error correction unit, and a framer.

The motivation for the standard relates to data signals may encounter different delays in transit from the SFI-5 source device to the sink device. The earliest arriving signal may lead the latest arriving by n bits. Relative to the earliest, each of the remaining signals is coincident, or is up to n unit intervals late. The search space for determining the relative delays of all 17 signals on SFI-5 is $(n+1)^{17}$ combinations. The deskew lane serves as a reference lane to allow each of the 16 data lanes to independently measure its own delay relative to the reference signal.

The deskew function is shared between the SFI-5 source and sink devices at either end of receive and transmit interfaces. In a source device, data is sampled from each of the 16 data lanes sequentially, and copied onto the deskew lane. The deskew lane is then sent with the 16 data lanes to the sink device over the SFI-5 interface. Data input to the sink device may be skewed by the different delays in each of the data lanes. It is the function of a deskew algorithm operating in the sink device to measure the amount of skew on each data channel, and then to use this skew information to compensate for the amount of skew. The deskew algorithm may make an initial skew measurement on initial power up or connection. Subsequent to skew measurement, external operation conditions may vary over time causing the relative skews in different lanes to change. SFI-5 compliant devices track skew changes without introducing data or transmission errors. The deskew algorithm typically operates continuously during normal operation of an SFR-5 interface to continuously track skew.

In another embodiment, a transceiver may have a plurality of XFI serial electrical interface inputs for receiving electrical signals which are encoded using such protocols as 10 Gb/s Ethernet, 10 Gb/s Fiber Channel, OC-192 SONET, or any other suitable protocols. The electrical signals received over the XFI serial electrical interface are in digital format (i.e., digital data signals). The inputs receive separate electrical signals and transmit the signals to respective clock and date recovery (CDR) circuits (not shown). The architecture and operation of CDR circuits are known to those skilled in the art.

The CDR circuits recover the clock and data from the digital electrical signals and transmit the data to respective laser drivers 38, 39, 40 and 41. The laser drivers convert the digital electrical signals into analog electrical signals suitable for directly driving lasers. Accordingly, the laser drivers modulate laser diodes and thereby convert the PAM electrical signal to optical beams. Each optical beam is centered about a separate specified wavelength λ1-λ4. An optical multiplexer 4b combines the separate optical beams into a single wavelength-division multiplexed optical beam that is output onto an optical fiber 47. The architectures and operations of the laser drivers, laser diodes and the optical multiplexer are known to those skilled in the art.

PAM encoding utilizes a multi-level analog signal to represent a data symbol representing two or more data bits. For example, PAM-5 encoding is a five level signal (e.g. −2v, −1v, 0v, 1v and 2v) encoding technique used to increase the number of bits per baud. By way of example, to encode eight bits, $2^8=256$ codes or symbols are needed for 256 possible pattern combinations. With four separate pairs being used for transmission and reception of data, a possibility of $5^3=625$ codes are theoretically available for PAM-5 encoding. In practice, only four levels may be used for data, while the fifth level (0v) is used for the four-dimensional eight-state Trellis Forward Error Correction used to recover the transmitted signal from error caused by high noise.

PAM-5 was adopted in the 1000-Base-T standard. In the twisted pair lines, the use of PAM-5 encoding can achieve 2 bits per baud with a 3 dB coding gain, yielding a significantly lower line rate. For fiber channels, however, the ISI, SNR, and non-linearity penalty on a multi-level amplitude signaling. The PAM-5 signaling may not travel in the fiber very far, and the current devices may not support this signaling. Until these concerns are rigorously answered, the PAM-5 encoding may not be able to compete with the 8B/10B and scrambled encoding.

The transceiver of FIG. 2, by concurrently transmitting four signals (in a multiplexed form), each with a bandwidth of 12.5 Gb/s, achieves an effective bandwidth of 100 Gb/s using a single optical fiber with PAM 4 encoding. In other embodiments, more than four laser and channels may be used in a transceiver such that the bandwidth of the optical fiber is increased corresponding to the number of channels. Depending upon the number of PAM levels, a specified datarate may be implemented using four WDM multiplexed signals. By way of example, when N channels are used, the effective bandwidth becomes N × (single channel bandwidth) wherein N is any suitable positive integer.

On the receive side of the transceiver, the transceiver also receives an input from a second optical fiber 48 that transmits a wavelength-division multiplexed optical beam. An optical demultiplexer 49 demultiplexes or splits the incoming optical beam into its component beams centered about separate specified wavelengths λ1-λ4. While the wavelengths (i.e., λ1-λ4) of the component beams in the input and output wavelength-division multiplexed optical beams are the same, these wavelengths may be different in other embodiments. Also, there may be more than four optical component beams having different wavelengths that make up one or both of the wavelength-division multiplexed optical beams in other embodiments.

High-speed photodiode detectors 50, 51, 52 and 53 respectively convert the four demultiplexed optical beams (i.e. component beams having wavelengths λ1-λ4) to analog electrical signals, in an operation that is known to those skilled in the art. The photodiode detectors may include a single photodiode array, or may include an array of individual photodiodes. Linear transimpedance amplifiers 54, 55, 56 and 57 convert the analog electrical signals from a current format to a voltage format and transmit the resulting voltage-formatted analog electrical signals to PAM retimers. Electronic Dispersion Compensation (EDC) circuits may also be provided in each lane, as set forth in copending U.S. patent application Ser. No. 11/212,822, filed Aug. 25, 2005, herein incorporated by reference.

The use of EDC circuits are useful in applications in which the received signals are likely to have been degraded by dispersion. The EDC circuits restore the electrical signals by compensating for the effects of dispersion. Each EDC circuit may process the analog electrical signals in the corresponding channel into a digital electrical signal (i.e., a digital data signal) during which the dispersion in the signal generated or caused in the optical fiber may be compensated.

By way of example, as a part of the dispersion compensation process, other signal anomalies such as noise, wander, and jitter may be removed, the original signal amplitude levels may be restored, and the pulse spectral shapes may be adjusted. This compensation is performed individually for each of the electrical signals corresponding to the component optical beams by a respective dedicated EDC circuit. The architecture and operation of the EDC circuit are known to those skilled in the art.

The invention claimed is:

1. An optical transmitter for converting and coupling an information-containing electrical signal with an optical fiber comprising:

an electrical input for coupling with an external electrical cable or information system device having a plurality of parallel data lines and for transmitting information-containing electrical communications signals over said data lines, and a fiber optic connector adapted for coupling with an external optical fiber for transmitting an optical communications signal;

a modulator for converting between an information-containing electrical signal on each data line and a pulse amplitude modulated signal corresponding to the binary electrical signal;

a signal timing circuit coupled to said modulator for aligning the data signal to a predetermined clock signal;

an electro-optical subassembly coupled to each respective timer circuit for converting between the information-containing electrical signal and a modulated optical signal corresponding to the electrical signal at a predetermined wavelength; and a multiplexer for multiplexing the respective optical beams into a single optical beam for transmission over the optical fiber, wherein said pulse amplitude modulated signal is a multilevel digital signal.

2. An optical transmitter for converting and coupling an information-containing electrical signal with an optical fiber comprising:

an electrical input for coupling with an external electrical cable or information system device having a plurality of parallel data lines and for transmitting information-containing electrical communications signals over said data lines, and a fiber optic connector adapted for coupling with an external optical fiber for transmitting an optical communications signal;

a modulator for converting between an information-containing electrical signal on each data line and a pulse amplitude modulated signal corresponding to the binary electrical signal;

a signal timing circuit coupled to said modulator for aligning the data signal to a predetermined clock signal;

an electro-optical subassembly coupled to each respective timer circuit for converting between the information-containing electrical signal and a modulated optical signal corresponding to the electrical signal at a predetermined wavelength; and a multiplexer for multiplexing the respective optical beams into a single optical beam for transmission over the optical fiber, wherein said single multifrequency optical beam transmits data at 100 Gbps.

3. An optical transceiver for converting and coupling an information-containing electrical signal with an optical fiber comprising:

a housing including an electrical connector for coupling with an external electrical cable or information system device and for transmitting and/or receiving an information-containing electrical communications signal, and a fiber optic connector adapted for coupling with an external optical fiber for transmitting and/or receiving an optical communications signal;

at least one electro-optical subassembly in the housing for converting between an information-containing electrical signal and a modulated optical signal corresponding to the electrical signal; and a multi-level digital pulse amplitude modulation processing subassembly in the housing for processing the communications signal into a predetermined electrical or optical communications protocol, wherein said multi-level digital pulse amplitude modulation processing subassembly encodes a two bit data signal into one of four optical amplitude levels.

* * * * *